United States Patent Office 3,047,622
Patented July 31, 1962

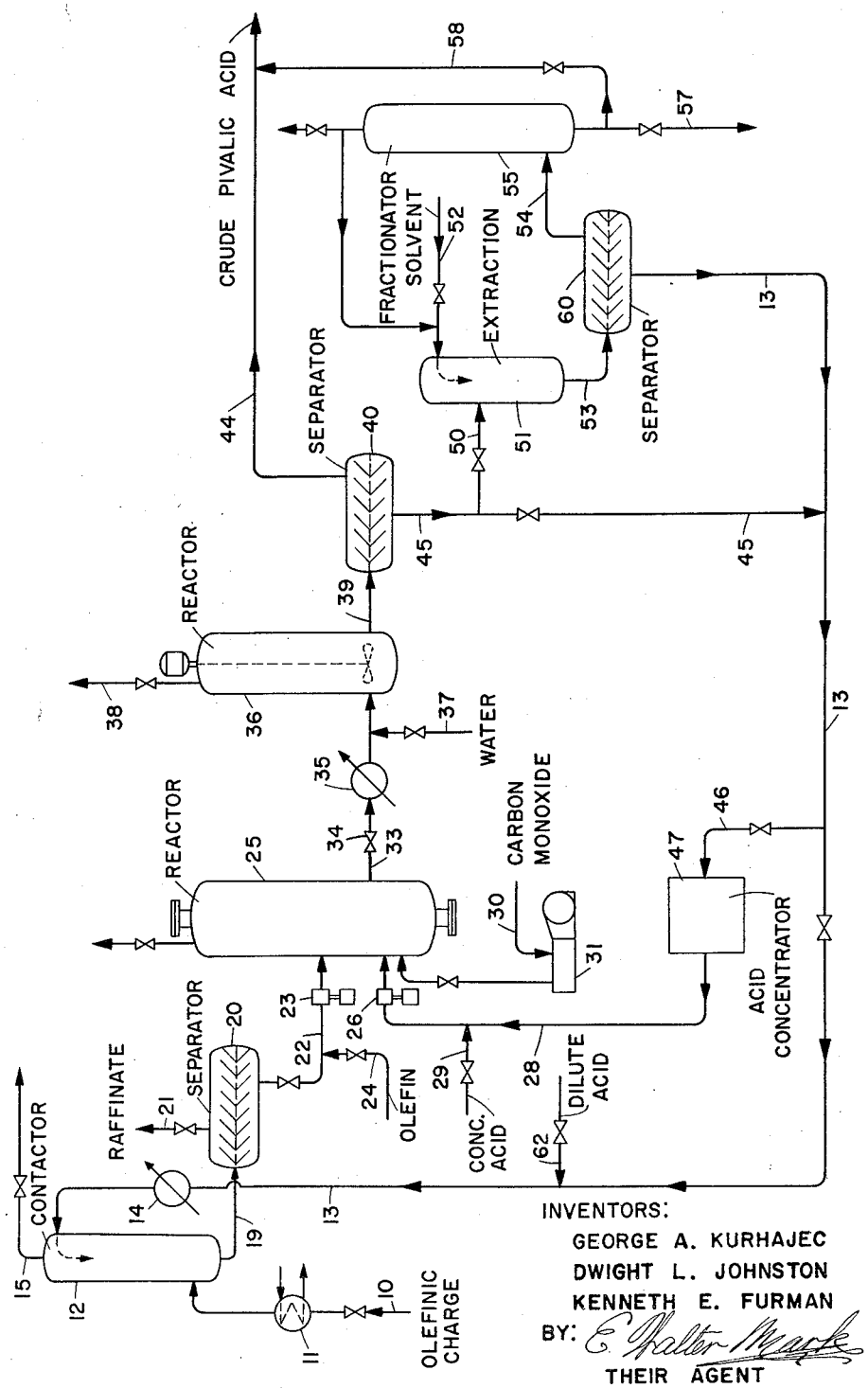

---

3,047,622
PRODUCTION OF CARBOXYLIC ACIDS
George A. Kurhajec, Orinda, Dwight L. Johnston, Concord, and Kenneth E. Furman, Richmond, Calif., assignors to Shell Oil Company, a corporation of Delaware
Filed Sept. 16, 1958, Ser. No. 761,376
4 Claims. (Cl. 260—533)

It is known that reaction mixtures containing organic acids can be obtained by contacting an admixture comprising carbon monoxide, water and an organic compound, such as, for example, an olefin, with certain catalysts under very specific conditions. Methods disclosed heretofore directed to the production of organic acids by such means generally relied upon the use of substantial amounts of water as an initial reactant and were generally carried out in vapor phase and at exceedingly high pressures. These processes generally were handicapped by relative inability to produce a reaction product predominating in a single desired organic acid or to produce desired acids with yields commensurate with practical operation. In addition the inordinately high cost of equipment necessary to carry out such operation at prescribed operating conditions, including the inordinately high pressures, rendered the production of the desired organic acids by such means highly impractical.

More recently it has been found that reaction mixtures comprising the desired organic acids can be obtained at substantially lower pressures by effecting the interaction of an olefin with carbon monoxide under substantially anhydrous conditions in the presence of a concentrated acid, such as concentrated sulfuric acid, and thereafter reacting the resulting reaction mixture thereby obtained with water. Although production of the acids under such conditions of lower pressures presents considerable advantage over the earlier high-pressure processes the method nevertheless possesses inherent disadvantages detracting materially from its efficient utilization on a practical scale. These comprise, for example, a relatively high rate of by-product formation. As a consequence of the complexity of the reaction mixtures generally obtained under these conditions and the relatively low content of the desired acid therein, the recovery of the desired organic acid in a relatively pure state therefrom is often exceedingly difficult in large-scale operation. In addition thereto the substantial loss of organic charge material represented by such undesired by-product formation adds considerably to the over-all cost of the process.

In copending application Serial No. 665,640, filed June 14, 1957, now U.S. Patent No. 2,913,489, issued November 17, 1959, there is disclosed and claimed a process enabling the production of the organic acids with substantially improved efficiency relying upon an alcohol and/or an ether and carbon monoxide as initial reactants. The process of the copending application, although enabling the obtaining of a desired organic acid in relatively high yields necessitates reliance upon a charge material which may not always be readily available.

It is therefore an object of the present invention to provide an improved process enabling the more efficient production of carboxylic acids from olefins and carbon monoxide wherein the above difficulties are obviated to at least a substantial degree.

Another object of the invention is to provide an improved process enabling the more efficient production of carboxylic acids from olefins and carbon monoxide in continuous operation.

Still another object of the invention is the provision of an improved process enabling the more efficient production of carboxyic acids from carbon monoxide and readily-available olefin-containing hydrocarbon fractions in a continuous operation.

A still further object of the invention is the provision of an improved process enabling the more efficient production of carboxylic acids from readily-available olefinic hydrocarbon fractions in an integrated system providing for initial concentration of the desired olefinic component of the charge within the system with the aid of a relatively dilute acid stream obtained within the system.

A specific object of the invention is the provision of an improved process enabling the more efficient production of pivalic acid (trimethylacetic acid) from carbon monoxide and four-carbon-atom olefin-containing hydrocarbon fractions.

Other objects and advantages of the present invention will become apparent from the following detailed description thereof made with reference to the attached drawing wherein the single FIGURE illustrates more or less diagrammatically an elevational view of one form of apparatus suitable for carrying out the invention.

In accordance with the invention an olefinic compound is combined with relatively dilute polybasic inorganic acid, thereby obtaining an olefinic compound-dilute acid admixture, reacting said olefinic compound-dilute acid admixture, while in liquid phase, with carbon monoxide, in the presence of sufficient concentrated sulfuric acid to result in a reaction mixture having a sulfuric acid strength above about 90%, in the absence of any substantial amount of water addition, at a temperature of from about $-10°$ to about $100°$ C. and a pressure of from about atmospheric to about 1,500 p.s.i.g., thereafter adding water to the resulting reaction mixture in the substantial absence of carbon monoxide addition, and separating organic acid from the resulting reaction mixture after said water addition.

Olefinic compounds employed as charge to the process of the invention comprise organic compounds containing an olefinic unsaturation, such as, for example, the monoolefinic hydrocarbons having at least three carbon atoms to the molecule. Examples of suitable olefins comprise propylene, butene-1, butene-2, isobutene, the pentenes, hexenes, heptenes, octenes, nonenes, decenes, their homologues; olefinic polymers, such as propylene tetramer; the cyclic olefins, such as cyclopentene, cyclohexene, 4-vinylcyclohexene-1, and the like; etc. Olefinic compounds having a carbinol group in addition to olefinic unsaturation, as well as olefinic compounds having substituents, such as halogen, which do not adversely affect the course of the reaction, for example, 4-methyl-4-pentene-2-ol, ricinoleic acid, soya fat acid, methallyl chloride, and the like, are comprised in the suitable unsaturated olefinic compounds which may be reacted in accordance with the invention. The olefinic charge to the process may comprise a single one, or a plurality of two or more, of the suitable olefinic compounds; hydrocarbon fractions comprising them; and the like. Preferred olefinic charge material comprises the monoolefins having up to twenty carbon atoms to the molecule. A particularly preferred charge comprises the tertiary base olefins (that is, those yielding a tertiary alcohol upon hydrolysis).

The olefinic charge to the process of the invention need not necessarily be in a state of high purity. Impurities generally encountered in the olefinic materials as commercially available do not adversely affect the efficiency of the process to any substantial extent.

Essential to the attainment of the objects of the invention is the initial combining of the olefinic charge to the process with a relatively dilute polybasic acid, such as, for example, aqueous sulfuric acid, or aqueous phosphoric acid, etc., aqueous sulfuric acid being preferred. The relatively dilute, or weak, acid thus initially combined with the olefinic charge is preferably of an acid strength not substantially in excess of about 80%. Preferred is the use of aqueous sulfuric acid containing from about 60% to about 75%, and still more preferably from about 65% to about 70%, by weight of sulfuric acid. The specific strength of the dilute acid preferably employed will depend to some extent upon the specific olefinic material charged and specific operating conditions employed. Admixture of the relatively dilute acid with the olefinic charge is generally effected at a temperature at which no substantial polymerization of the olefins is encountered. Thus the dilute acid may be combined with olefinic charge at a temperature in the range of, for example, from about 0° to about 40° C. The specific temperature preferably employed will depend upon the specific olefinic charge and degree of acid strength used. Higher temperatures may however be employed within the scope of the invention. Thus at times it is desirable to produce reaction mixtures comprising higher boiling organic acids, corresponding approximately to the polymeric compounds of the olefinic charge. In such case initial admixing of dilute acid with olefinic charge may be carried out at a higher temperature, for example, as high as about 100° C., to obtain polymerization of at least a substantial part of the olefinic compounds charged while in contact with the dilute acid during the initial phase of the process.

The resulting admixture obtained by combining dilute acid and olefinic charge in the initial phase of the process is thereupon reacted with carbon monoxide in the presence of sufficient added concentrated sulfuric acid to obtain a reaction mixture having an acid strength of at least 90%. The dilute acid-olefinic charge mixture thus initially formed may comprise at least a part or all of the olefinic constituents in the form of suspension, solution, or reaction product with the acid.

The method of combining the preformed admixture of dilute acid and olefinic charge with the concentrated sulfuric acid may vary within the scope of the invention. Thus, the admixture of dilute acid and olefinic charge may be introduced into a large body of concentrated sulfuric acid. In such case the body of concentrated sulfuric acid is preferably under carbon monoxide pressure. In continuous operation it is generally preferred to effect the addition of a continuous stream of the preformed dilute acid-olefinic compound admixture to a body of concentrated sulfuric acid in a reaction zone maintained under a substantial carbon monoxide pressure.

Contact of the fortified acid-olefinic compound admixture with carbon monoxide is carried out at relatively mild conditions. Temperatures of, for example, from about −10° to about 100° C., and preferably in the range of from about 20° to about 60° C. are employed. Carbon monoxide pressures ranging from about atmospheric to about 1,500 p.s.i.g and higher may be used. However, pressures higher than about 700 p.s.i.g. need generally not be used. A constant carbon monoxide pressure in the range of, for example, from about 100 to about 650 p.s.i.g. is generally preferred. A particularly suitable pressure range is that from about 450 to about 550 p.s.i.g. Conditions are controlled so that at least the greater part of the olefinic charge is in the liquid phase throughout the course of the reaction.

Essential to the attainment of the objects of the invention is the avoidance of introduction of any substantial amount of water into the reaction zone from an outside source during the course of the reaction with carbon monoxide.

Upon completion of the reaction the reaction mixture is brought to substantially atmospheric pressure, and contacted with water. The water so added may be in the form of ice, liquid water or steam. Organic acid is thereupon separated from the reaction mixture resulting from the reaction with the water, by conventional means comprising one or more such steps as, for example, decantation, distillation, extractive distillation, adsorption, solvent extraction, and the like.

A particular advantage of the process of the invention resides in its ability to convert olefinic constituents contained in readily-available hydrocarbon fractions to the desired organic acids. In order to set forth more fully the nature of the invention, it will be described in detail herein in its application to the production of a carboxylic acid in a continuous operation employing a tertiary base olefin-containing hydrocarbon fraction as the olefinic charge.

Referring to the attached drawing, a tertiary base olefin-containing hydrocarbon fraction, such as, for example, an isobutylene-containing butane-butene fraction, is forced through valved line 10, provided with heat exchanger 11, into a suitable contacting zone, comprising, for example, a column 12. At least a part of the normal olefins in the butane-butene fraction may be removed from the charge by conventional means, such as distillation, before it enters column 12. Within column 12 the hydrocarbon stream is contacted with dilute sulfuric acid emanating from within the system through line 13, provided with cooler 14, as described hereinbelow. Conditions in column 12 are controlled to obtain absorption of at least a substantial part of the isobutylene content of the hydrocarbon charge to column 12 in the dilute sulfuric acid. The dilute sulfuric acid will generally have an acid strength not substantially in excess of about 80%, and preferably not above about 75% (on a hydrocarbon-free basis). A preferred dilute acid charge to column 12 is aqueous sulfuric acid having an acid strength in the range of from about 65% to about 75%. Conditions conducive to absorption of the tertiary olefin into the acid stream within column 12 are maintained with the aid of the heat exchanger 11, cooler 14, and optionally with the aid of other means not shown in the drawing.

Pressures maintained within column 12 are preferably sufficiently high to maintain at least a substantial part of the hydrocarbons charged thereto in the liquid phase. If desired, at least a part of unabsorbed hydrocarbons, present in the vapor phase, may be withdrawn from column 12 through valved line 15.

Unabsorbed hydrocarbons are separated from the resulting rich absorbate (fat acid). To this effect, liquid, comprising fat acid and unabsorbed hydrocarbons, is passed from column 12 through line 19 to a suitable separating zone such as, for example, vessel 20, wherein phase separation takes place. The upper phase consisting essentially of unabsorbed hydrocarbons is removed from vessel 20 through valved line 21. The lower liquid phase, consisting essentially of fat acid comprising the isobutylene-dilute sulfuric acid absorbate, is forced through valved line 22, by means of a pump 23, into a suitable reaction zone, for example, reactor 25.

The fat acid stream thus entering reactor 25 through line 22 will generally comprise at least a substantial part of the absorbed isobutylene as sulfuric acid ester. A valved line 24 is provided for introducing additional olefinic hydrocarbons consisting essentially of isobutylene into line 22, should this be desired.

Concentrated sulfuric acid is forced through line 28, provided with pump 26, into reactor 25. The amount of concentrated sulfuric acid thus introduced through line 28 is controlled to result in a reaction mixture within reactor 25 having an acid strength of at least 90% (on a hydrocarbon-free basis) throughout the course of the reaction. Valved line 29 is provided for introducing make-up concentrated sulfuric acid into the system from an outside source.

Carbon monoxide is introduced into reactor 25 by means of valved line 30, provided with suitable means such as, for example, compressor 31, for maintaining a carbon monoxide pressure within the reactor 25. The carbon monoxide need not necessarily be in pure state and may comprise impurities generally encountered in the commercially available gas. A suitable carbon monoxide charge comprises industrial water gas.

Conditions within reactor 25 are controlled, by means not shown in the drawing, to maintain the contents therein at a temperature in the range of from about −10° to about 100° C., and preferably from about 20° to about 60° C. The carbon monoxide pressure within reactor 25 is maintained in the range of, for example, from about slightly superatmospheric to about 1,500 p.s.i.g., and preferably from about 100 to about 650 p.s.i.g. throughout the course of the reaction. Means assuring efficient contact between reactants within reactor 25, such as stirring and/or other devices not shown in the drawing, are preferably provided. Residence time within reactor 25 may vary within the scope of the invention and will depend to some extent upon the specific olefinic charge employed, the specific acid strength above at least 90% prevailing therein and conditions of temperature and pressure. A residence time of, for example, from about five minutes to about three hours, is generally satisfactory. Longer or shorter contact times may however be employed within the scope of the invention. Generally it is preferred to maintain the residence time sufficiently long to assure completion of the interaction between carbon monoxide and liquid reactants within the reactor. The reaction may be initiated in reactor 25 and completed in a separate reaction or digestion chamber. It is at times preferred to maintain the reaction conditions of temperature and carbon monoxide pressure for a period of time beyond that at which substantial absorption of carbon monoxide by the liquid reactants has stopped. Such completion and/or digestion of the reaction mixture, if restored to, is preferably carried out in one or more zones such as chambers, coils or the like, in communication with reactor 25 not shown in the drawing. The presence of an atmosphere of carbon monoxide, under the reaction pressure, in the absence of any added water is maintained throughout the reaction and optional digestion period. Essential to the attainment of the objects of the invention is the maintenance of the acid strength of the reaction mixture in excess of about 90% (on a hydrocarbon-free basis) throughout the course of reaction, and optional digestion, in the presence of the carbon monoxide pressure.

The reaction mixture formed in reactor 25 is passed therefrom, preferably in continuous stream, through line 33 provided with reducing valve 34 and cooler 35, into a second reaction zone, for example, reactor 36. Water emanating from an outside source is passed through valved line 37 into line 33 to mix therein with the reaction mixture emanating from reactor 25. With the aid of reducing valve 34 and cooler 35, and optionally with the aid of additional means not shown in the drawing, the temperature and pressure of the reaction mixture emanating from reactor 25 is controlled to result in its admixture with water in line 33 at substantially atmospheric pressure and substantially normal temperature. Interaction of the reaction mixture emanating from reactor 25 with the water generally proceeds at a rapid rate and is permitted to attain completion within reactor 36. At least a part of the gaseous material, comprising, for example, carbon monoxide and any hydrocarbons entering reactor 36, may be eliminated therefrom by venting through valved line 38. Reactor 36 is suitably maintained at substantially atmospheric pressure and temperature. The maintenance therein of higher temperatures and/or pressures, is, however, comprised within the scope of the invention.

Reaction of the reaction mixture emanating from reactor 25 with water in line 33 and in chamber reactor 36 will result in a final reaction mixture comprising the desired trimethylacetic acid and dilute sulfuric acid.

The reaction mixture comprising trimethylacetic acid and dilute sulfuric acid formed in reactor 36 is passed therefrom through line 39 to a suitable separating zone, for example, a chamber 40 wherein stratification is allowed to take place. Within chamber 40 an upper organic layer comprising trimethylacetic acid will separate from a lower layer consisting essentially of dilute sulfuric acid. Upper organic phase, comprising trimethylacetic acid, is drawn from chamber 40 through line 44 as a desired product.

The lower liquid layer, consisting essentially of dilute sulfuric acid, is drawn from chamber 40, and passed through valved lines 45 and 13 to column 12 to be used therein as the dilute sulfuric acid absorbent. A part of the stream of dilute acid thus passing through line 13 is passed through valved line 46 to a conventional concentrating zone represented in the drawing by box 47 wherein it is concentrated to an acid strength above 90%, preferably above about 96%. The concentrated sulfuric acid thus obtained is passed from concentrator 47, and forced through valved line 28, into reactor 25 to be used therein as the concentrated sulfuric acid stream referred to herein above.

The lower liquid phase in chamber 40 will generally contain varying amounts of trimethylacetic acid. In a preferred method of carrying out the process, the lower phase separated in chamber 40 is preferably subjected to suitable means to effect the recovery of trimethylacetic acid therefrom before recycling the acid to the system. Thus the acid layer withdrawn from chamber 40 through line 45 may be passed in part or entirety, through valved line 50 into a suitable extraction zone, for example, extraction column 51. In extraction column 51 the dilute acid stream is subjected to solvent extraction with a suitable solvent, for example, a paraffinic hydrocarbon solvent such as heptane. To this effect, heptane is introduced into column 51 through line 52. Within column 51 trimethylacetic acid is absorbed selectively by the heptane. Liquid, comprising rich absorbate and dilute acid, is passed from column 51, through line 53 into a chamber 60 wherein stratification takes place. The upper organic phase, consisting essentially of rich absorbate is passed through line 54 to column 55 wherein trimethylacetic acid is separated from heptane solvent. Heptane solvent is passed from column 55, through lines 56 and 52 into column 51. Trimethylacetic acid is taken from column 55 through valved line 57 as additional desired product, and is optionally combined by means of valved line 58 with the trimethylacetic acid stream emanating from chamber 40 through line 44.

Dilute acid, separated as the lower phase in chamber 60, is passed therefrom by means of line 13 to column 12, and in part by means of line 46 into acid concentrator 47.

Introduction of water into the system by means of line 37 is controlled to obtain a dilute acid recycle stream flowing through line 13 having an acid strength within the preferred concentration range defined herein above. A valved line 62 is provided for the introduction of dilute acid from an outside source into the system whenever needed.

Although in the above-detailed illustrative description of the invention, the production of trimethylacetic acid from isobutylene-containing hydrocarbon fractions has been stressed, the invention is in no wise limited to the production of carboxylic acid from but this specific olefin. Thus, the charge introduced into the system through valved line 10 may comprise any member of the above-defined class of suitable olefinic charge materials. Conditions within column 12 are controlled to effect the selective absorption of a single specific olefin or a mixture of olefins; or the conditions therein may be those resulting in simple admixturing of an olefinic charge with the dilute acid.

Solvents which are liquid under the conditions of execution of the reaction may be used within the scope of the invention. Such solvents comprise, for example, normally liquid saturated hydrocarbons, such as heptanes, octanes; aliphatic ketones, such as dimethyl ketone; etc.

The solvent employed may be added to the olefinic charge or introduced separately into the system. When the olefin charge to the system is a high-boiling or normally solid compound, it is at times advantageous to introduce it into the system as a solution in a suitable solvent.

Under the above-defined conditions olefins having more than two carbon atoms to the molecule result in a reaction mixture in which the predominating organic acid is a secondary or tertiary carboxylic acid. The organic acids obtained will correspond to the compounds obtained by removing an olefinic linkage in the olefinic charge and attaching a carboxy group (—COOH) directly to one, and a hydrogen atom to the other, of the two olefinically-unsaturated carbon atoms linked by the olefinic bond in the charge material. Propylene results in isobutyric acid; butene-1 and butene-2 in 2-methyl butyric acid; isobutylene in trimethyl acetic acid; octene-1 and octene-2 in 2-methyl octenoic acid; cyclohexene in acids comprising methyl cyclopentane carboxylic acid and cyclohexane carboxylic acid; etc.

*Example I*

In a continuous operation using apparatus substantially as shown in the attached drawing, 384 parts of a $C_4$-hydrocarbon fraction, containing 24 weight percent isobutylene, are introduced in continuous stream into a contactor (12). 179 parts of 65 weight percent aqueous sulfuric acid, recycled from within the system as described herein, are also introduced in continuous stream into the contactor. The resulting admixture formed in the contactor is passed to a phase separator (20) wherein separation of two phases, an upper hydrocarbon phase and a lower aqueous sulfuric acid-isobutylene extract phase, takes place. The extract phase contains 82 parts of isobutylene (or its equivalent). The extract phase is passed in continuous stream into a first reactor (25). 460 parts of concentrated sulfuric acid are introduced in continuous stream into the first reactor. The first reactor is maintained under a constant carbon monoxide pressure of 400 p.s.i.g. by pressuring in carbon monoxide from an outside source. Contents of the first reactor are constantly agitated and maintained at a temperature of 55° C. The reaction in the first reactor is executed with a nominal residence time of one hour. The reaction mixture is passed in continuous stream from the first reactor (25) into a second reactor (36). 267 parts of water are introduced as continuous stream into the second reactor which is maintained at a temperature of 55° C. and at substantially atmospheric pressure. A nominal residence time of 20 minutes is maintained in the second reactor. The liquid contents of the second reactor are passed in continuous stream into a phase separator (40) wherein an upper trimethylacetic acid phase separates from a lower aqueous sulfuric acid phase. 90 percent of the trimethylacetic acid produced is found in the upper phase formed in phase separator (40). The upper phase is withdrawn therefrom as final product. The aqueous, lower phase, separated in separator (40), consists essentially of 65 weight percent aqueous sulfuric acid containing the remaining 10% of the trimethylacetic acid produced. The aqueous acid phase is withdrawn continuously from separator (40) and the trimethylacetic acid content selectively extracted therefrom with $C_7$ paraffinic hydrocarbon solvent. The aqueous sulfuric acid phase so freed of trimethylacetic acid, is recycled in the relative amount indicated above to be used as the continuous stream of 65% aqueous sulfuric acid charged to the contactor (12) as described above. A controlled amount of the remainder of the aqueous sulfuric acid phase is reconcentrated and recycled to form, together with make-up concentrated sulfuric acid from an outside source, the concentrated sulfuric acid stream introduced into the first reactor (25) as described above. A total of 136 parts of crude trimethylacetic acid are formed with a yield of 87% by weight.

*Example II*

Isobutylene is dissolved in aqueous 65% $H_2SO_4$ at 30° C. and a pressure of 150 p.s.i.g. The resulting solution contains a ratio of isobutylene to 65% $H_2SO_4$ of 1:2 by weight. The solution of isobutylene in 65% $H_2SO_4$ so obtained is then added to concentrated (92%) $H_2SO_4$ under a carbon monoxide pressure of 500 p.s.i.g. with vigorous stirring at 20° C. The mol ratio of isobutylene to total sulfuric acid in the resulting fortified mixture is 3.3:10. The resulting fortified solution is subjected to a constant carbon monoxide pressure of 500 p.s.i.g. at a temperature of 20° C. until no further absorption of carbon monoxide is evident. Pressuring with carbon monoxide is then terminated, and the pressure reduced to substantially atmospheric by venting. Water is added to the resulting reaction mixture in an amount equal to about 400% by volume at a temperature of 0° C. while at atmospheric pressure. Reaction is rapid with the formation of two separate liquid layers; an upper organic layer and a lower aqueous sulfuric acid layer. Analysis of the products thus obtained indicates that substantially all butylene has reacted with the production of 0.9 mol organic acid product per mol isobutylene charged with a yield of trimethylacetic acid of 83%; the rest of the organic acid obtained being polymeric in character.

*Example III*

For the purpose of comparison isobutylene is added directly to concentrated sulfuric acid (92%) under a carbon monoxide pressure of 500 p.s.i.g. The mol ratio of isobutylene to sulfuric acid in the resulting admixture is 3.3:10. The resulting solution is maintained at a constant carbon monoxide pressure of 500 p.s.i.g. at a temperature of 20° C. until no further absorption of carbon monoxide is apparent. Pressuring with carbon monoxide is then stopped and the pressure brought to atmospheric by venting. Water is then added to the resulting reaction mixture in an amount equal to 400% by volume at 0° C. Reaction is rapid with the formation of two separate liquid layers; an upper organic layer and a lower aqueous sulfuric acid layer. Analysis of the products thus obtained indicates that substantially all isobutylene has undergone reaction with the formation of 0.59 mol of organic acid product per mol of isobutylene charged with a yield of 47% of trimethylacetic acid; the rest of the organic acid obtained being polymeric in character.

The invention claimed is:

1. The process for the production of trimethylacetic acid which comprises admixing isobutylene with dilute aqueous sulfuric acid having a sulfuric acid content of from about 60 to about 80% by weight, combining the resulting admixture with sufficient concentrated sulfuric acid under carbon monoxide pressure to obtain a fortified admixture of isobutylene with sulfuric acid of at least 90% concentration, reacting said fortified admixture with carbon monoxide at a temperature of from about −10 to about 100° C., and a carbon monoxide pressure of from about atmospheric to about 1500 p.s.i.g., reacting the resulting reaction mixture with water, thereby forming a dilute reaction mixture comprising trimethylacetic acid and dilute aqueous sulfuric acid, and separating trimethylacetic acid from said dilute reaction mixture.

2. The process for the production of trimethylacetic acid which comprises admixing isobutylene with dilute aqueous sulfuric acid having a sulfuric acid content of from about 65 to about 75% by weight, combining the resulting admixture with sufficient concentrated sulfuric acid to obtain a fortified admixture of isobutylene with sulfuric acid of at least 90% concentration, reacting said fortified admixture with carbon monoxide at a temperature of from about 20° to about 60° C., and a carbon monoxide pressure of from about 100 to about 650 p.s.i.g., reacting the resulting reaction mixture with water thereby forming a dilute reaction mixture comprising trimethylacetic acid and dilute aqueous sulfuric acid, and separating trimethylacetic acid from said dilute reaction mixture.

3. The process in accordance with claim 2 wherein the amount of water reacted with said reaction mixture is controlled to obtain a dilute reaction mixture containing dilute aqueous sulfuric acid having a concentration in the range of from about 65% to about 75%, separating said dilute aqueous sulfuric acid from said dilute reaction mixture, and employing at least a part of said separated dilute aqueous sulfuric acid as said dilute aqueous sulfuric acid admixed with said isobutylene.

4. The process for the production of trimethylacetic acid which comprises contacting an isobutylene-containing $C_4$ hydrocarbon fraction consisting essentially of admixed butanes and butenes with dilute aqueous sulfuric acid recycled from within the system containing from about 60 to about 80% by weight of sulfuric acid, thereby forming a rich absorbate of isobutylene in dilute sulfuric acid, adding said rich absorbate, while under carbon monoxide pressure, to sufficient concentrated sulfuric acid to obtain a fortified admixture of absorbed isobutylene with sulfuric acid of at least about 90% concentration, reacting said fortified admixture with carbon monoxide at a temperature of from about −10° to about 100° C., and under a carbon monoxide pressure of from about atmospheric to about 1500 p.s.i.g., thereafter reacting the resulting reaction mixture with water, thereby forming a dilute reaction mixture comprising trimethylacetic acid and dilute sulfuric acid, controlling the amount of water reacted with said reaction mixture so that said dilute aqueous sulfuric acid in said dilute reaction mixture has a sulfuric acid content of from about 60 to about 80% by weight, separately recovering trimethylacetic acid and said dilute aqueous sulfuric acid from said dilute reaction mixture, and employnig said recovered dilute aqueous sulfuric acid as said dilute aqueous sulfuric acid recycled from within the system which is contacted with said $C_4$ hydrocarbon fraction.

References Cited in the file of this patent

UNITED STATES PATENTS

| 2,419,131 | Ford | Apr. 15, 1947 |
| 2,813,877 | Koch | Apr. 22, 1958 |

OTHER REFERENCES

Wagner et al.: Synthetic Organic Chemistry, pages 32, 35, 40 41, and 437 (1953). (Copy in Scientific Library.)